United States Patent
Ennis et al.

(10) Patent No.: US 10,733,495 B2
(45) Date of Patent: Aug. 4, 2020

(54) WEARABLE RFID DEVICE

(71) Applicant: Precision Dynamics Corporation, Valencia, CA (US)

(72) Inventors: Ronald G. Ennis, Los Angeles, CA (US); James Kopitzke, Valencia, CA (US)

(73) Assignee: Precision Dynamics Corporation, Valencia, CA (US)

( * ) Notice: Subject to any disclaimer, the term of this patent is extended or adjusted under 35 U.S.C. 154(b) by 0 days.

(21) Appl. No.: 16/116,319

(22) Filed: Aug. 29, 2018

(65) Prior Publication Data

US 2019/0065920 A1 Feb. 28, 2019

Related U.S. Application Data

(60) Provisional application No. 62/551,908, filed on Aug. 30, 2017.

(51) Int. Cl.
*G06K 19/077* (2006.01)

(52) U.S. Cl.
CPC ... *G06K 19/0776* (2013.01); *G06K 19/07762* (2013.01)

(58) Field of Classification Search
CPC .................. G06K 19/0776; G06K 19/07762
See application file for complete search history.

(56) References Cited

U.S. PATENT DOCUMENTS

| | | | |
|---|---|---|---|
| 5,973,600 A | 10/1999 | Mosher, Jr. | |
| 6,888,502 B2 | 5/2005 | Beigel | |
| 7,071,826 B2 | 7/2006 | Peterson | |
| 8,074,389 B2 * | 12/2011 | Greer | G09F 3/005 283/75 |
| 2005/0108912 A1 * | 5/2005 | Bekker | G09F 3/005 40/633 |
| 2007/0011870 A1 * | 1/2007 | Lerch | G06K 19/07749 29/832 |
| 2008/0307685 A1 * | 12/2008 | Ali | G09F 3/005 40/633 |
| 2009/0094872 A1 * | 4/2009 | Ali | G09F 3/005 40/633 |
| 2010/0289622 A1 | 11/2010 | Hall | |
| 2011/0042933 A1 * | 2/2011 | Landsman | G09F 3/005 283/70 |
| 2012/0285058 A1 * | 11/2012 | Bekker | A61B 5/117 40/633 |
| 2013/0265142 A1 * | 10/2013 | Jones | G06K 17/0025 340/10.51 |
| 2014/0297371 A1 * | 10/2014 | Colburn | G07C 1/10 705/7.38 |
| 2017/0039466 A1 | 2/2017 | Krishna | |

FOREIGN PATENT DOCUMENTS

EP 2001-627516 * 12/2000

* cited by examiner

*Primary Examiner* — Laura A Gudorf
(74) *Attorney, Agent, or Firm* — Quarles & Brady LLP

(57) ABSTRACT

A wearable radio frequency identification (RFID) includes a band that forms a loop and a flag that projects outwardly from the loop which includes an RFID transponder. By virtue of being part of the flag, the RFID transponder is spatially separated from a radially-outward facing surface of the loop and thereby also apart from a user wearing the device. This provides improved read ranges of the RFID transponder when used with an energy absorbing or conductive object.

15 Claims, 9 Drawing Sheets

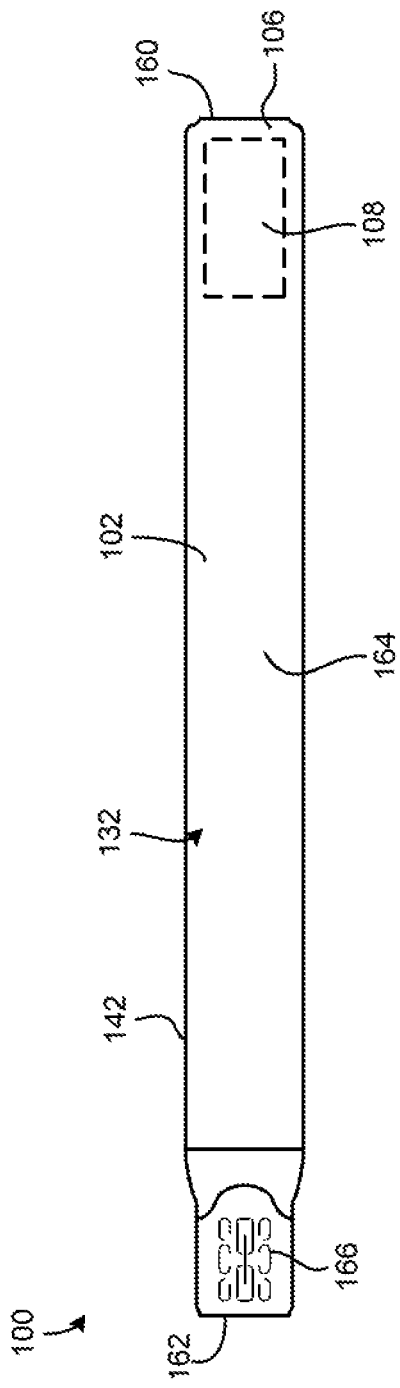
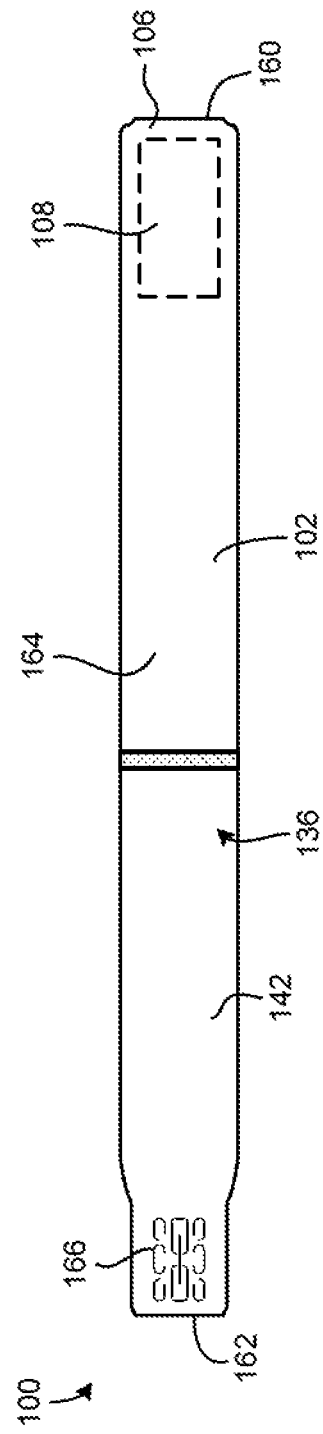

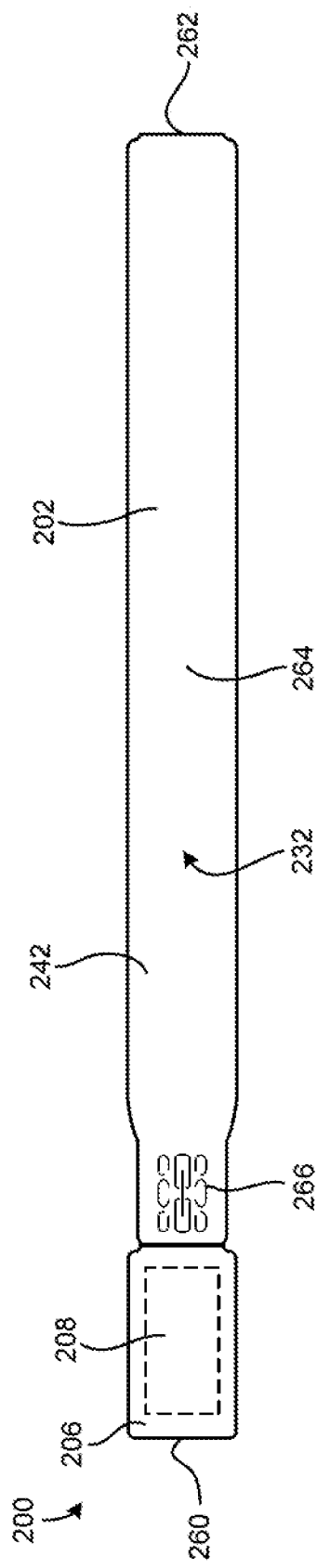
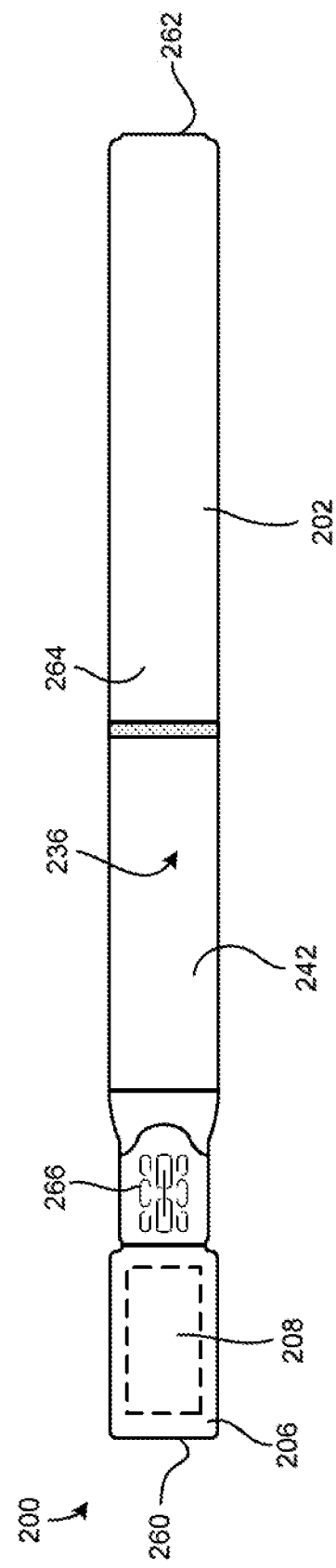
FIG. 4A
FIG. 4B

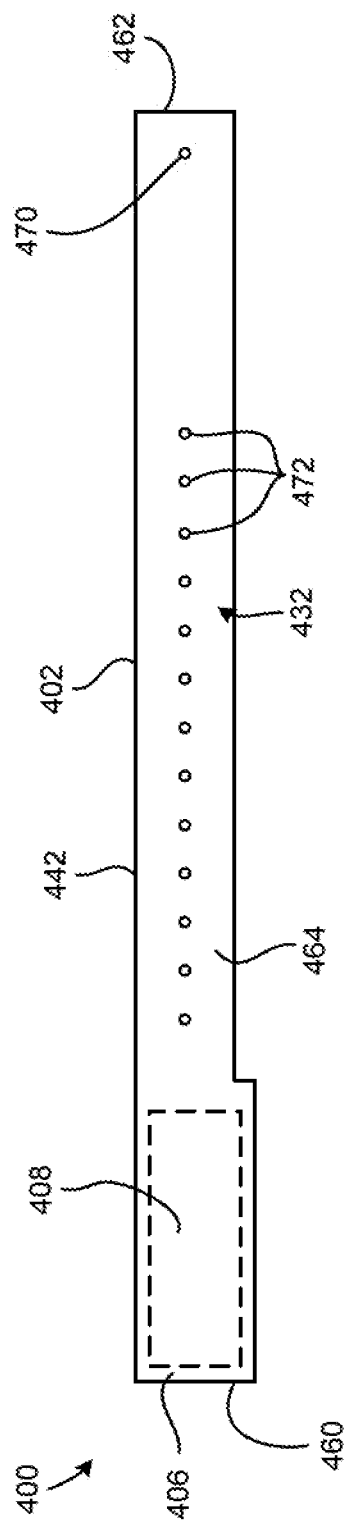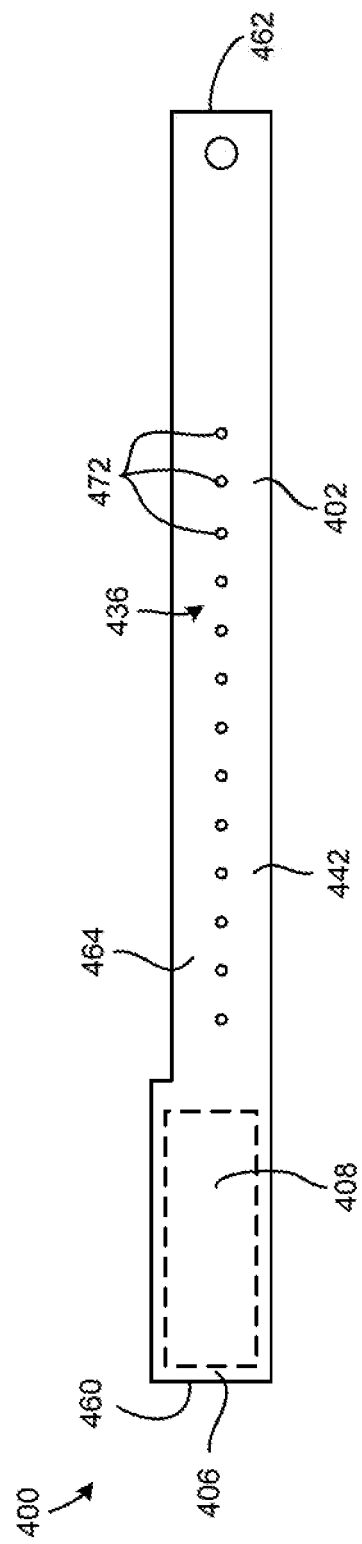

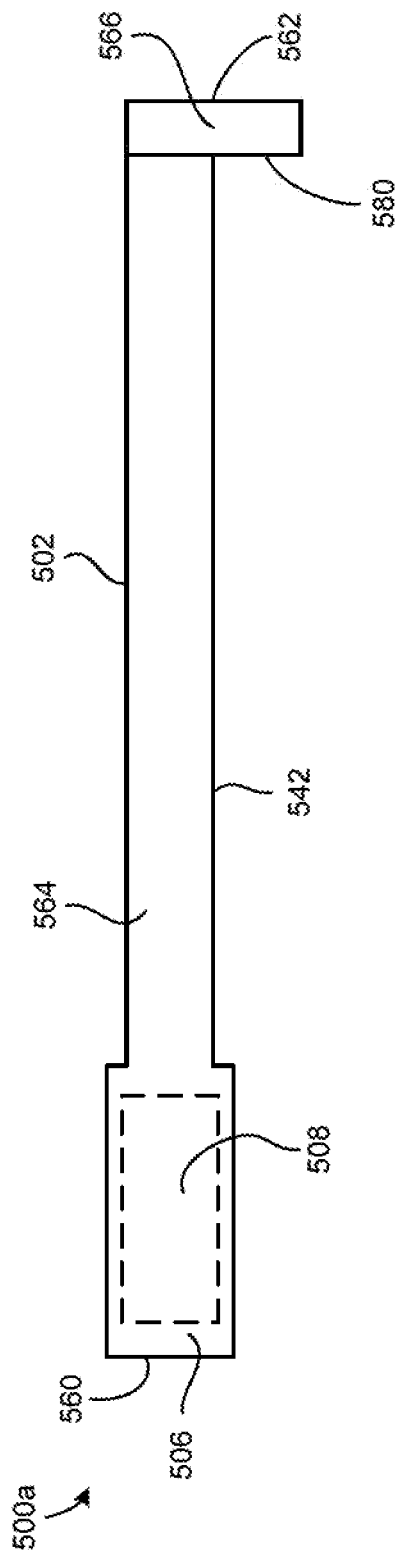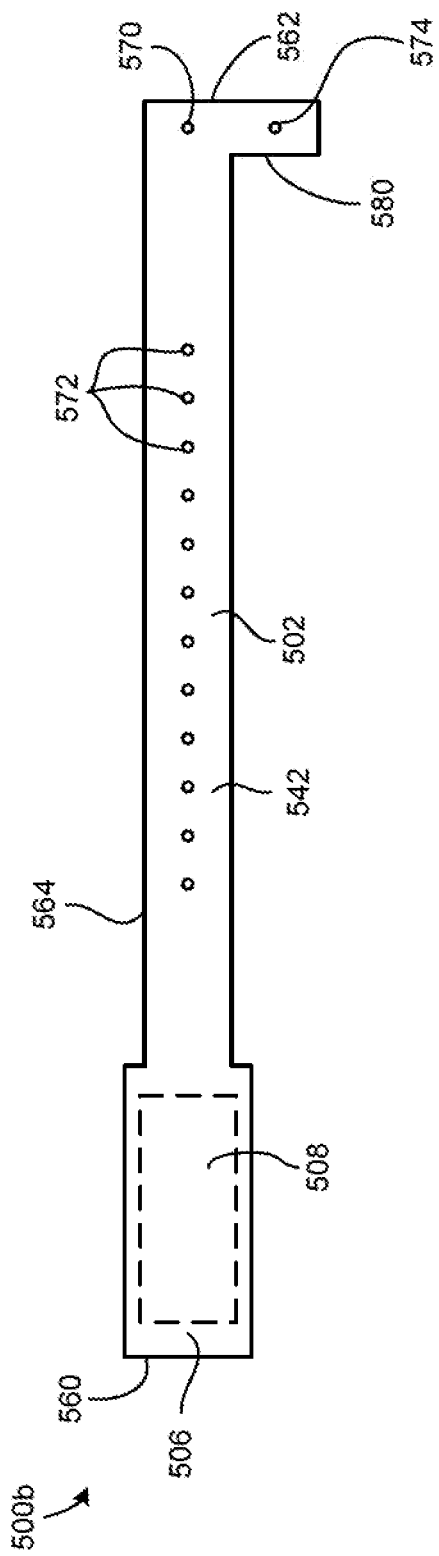

WEARABLE RFID DEVICE

CROSS-REFERENCE TO RELATED APPLICATION

This application claims the benefit of U.S. Provisional Patent Application No. 62/551,908 filed Aug. 30, 2017 and entitled "Passive RFID Device" which is incorporated herein by reference in its entirety for all purposes.

TECHNICAL FIELD

This application relates to radio frequency identification devices, in particular, wearable radio frequency identification devices.

BACKGROUND

Radio frequency identification ("RFID") uses electromagnetic fields and radio frequency ("RF") signals to wirelessly communicate between a RFID reader (e.g., a local interrogator) and RFID transponder (e.g., a tag). RFID systems can be used for a wide array of purposes, such as inventory management and tracking, access control, or wireless data communication.

A typical RFID transponder includes an integrated circuit ("IC") for storing information and an antenna for sending and receiving signals from the RFID reader and is either active or passive. Active RFID systems include a power source such as a battery for powering the IC and antenna. However, in passive RFID systems, the RFID transponder does not include a power source; instead, the transponder harnesses energy from an interrogation signal sent by the RFID reader and received by the antenna and then utilizes that energy to identify itself or other information associated with the transponder.

SUMMARY

In the healthcare industry, as well as in other industries, RFID tags have been implemented as a wearable device for tracking or communicating information about a patient or other user wearing the device. Such wearable devices are typically wrist or ankle bands that get attached to the wearer during or after admission to a hospital. However, such wearable devices might be used in many other contexts as well including at amusement parks, at events, or at other secured locations, for example.

However, when in close proximity to energy absorbing or conductive materials such as the human body, passive RFID tags, especially those operating in ultra-high frequency (UHF) band, suffer from reduced transmission ranges. To attempt to overcome this problem, an insulating material—typically a foam—has been used to separate the RFID transponder from a wearer's skin in bands. However, the addition of an insulating layer has many downsides. Among other things, the insulating layer increases the cost and complexity of fabrication and increases the bulk of the band which can make the band difficult to print on and slightly awkward to wear.

Although active RFID tags provide another alternative, active RFID tags also suffer from the pitfalls of larger size due to the inclusion of a power source and limited battery life.

Disclosed herein are various improved structures for supporting passive RFID tags in wearable bands which address the aforementioned limitations in a novel manner. These structures increase the range at which an RFID reader can communicate with a passive RFID transponder that is secured to an energy absorbing or conductive object without the use of an insulating material or resorting to active RFID transponders.

This can be achieved by implementing a passive RFID tag in a band having an integrally-formed flag with a RFID transponder or an inlay. The flag is configured to protrude away from the any object the loop is formed around, spatially-separating the RFID transponder from said object. The separation created by the flag significantly reduces or eliminates any signal loss due to the presence of an adjacent signal-absorbing body, thereby increasing the transmission range. A further advantage of the new design is that the RFID tag can be formed in a simplified manufacturing process since additional insulating materials are not required. The slim form-factor of the band provides increased comfort to a user wearing the RFID tag, and enables easy use of a wide range of RFID printers for printing and/or encoding on said RFID tag.

According to one aspect, a radio frequency identification (RFID) tag, designed for use with an object having energy absorbing or conductive properties, includes a band including a loop and a flag projecting outwardly from the loop. The flag includes a RFID transponder and spatially separates the RFID transponder from a radially-outward facing surface of the loop. This flag structure positions the RFID transponder apart from the object around which the band is secured. Among other things, this enables existing passive RFID transponders to be easily implemented in a wearable RFID tag in a way that does not suffer from reduced read ranges.

In some forms, the band may include an upper surface and a lower surface and the upper surface may form the radially-outward facing surface of the loop.

In some forms, the RFID transponder may be retained within the flag between the upper surface and the lower surface. The RFID transponder may be housed within the body of the flag, thereby protecting the tag from damage and preserving a low form-factor.

In some forms, the band may have a top layer and a bottom layer that may be secured to the top layer with an adhesive. Thus, it can be seen that the construction of a band of this type may not require any complex manufacturing processes.

In some forms, the RFID transponder may be secured to the flag with an adhesive. This provides one method of securing the RFID transponder to the flag which involves simple manufacturing steps.

In some forms, prior to forming the loop, the band may include a first end, a second end opposite the first end, and an elongated section extending between the first end and the second end. The elongated section can be flexible, and the flag can be positioned at the first end of the band. The width of the flag may be greater than the width of the elongated section and the second end. The flag may include an aperture sized to receive the elongated section and the loop may be formed by moving the second end through the aperture. The aperture can provide a secure way to hold the band in the looped form. In some forms, the RFID tag may include an adhesive disposed on the band proximate the second end. The adhesive may be configured to selectively secure the second end to a portion of the elongated section. Further, the loop may be formed by securing the second end to the elongated section. In other forms, the RFID tag can include an adhesive disposed on the band proximate the first end. The adhesive may be configured to selectively secure the first end to a portion of the elongated section. Further, the loop may be formed by securing the first end to the elongated section.

In some forms, the band may be resistant to damage caused by at least one of liquid and abrasion.

In some forms, the loop may be selectively formed by the band.

In some forms, prior to being formed into a loop, the band may be a planar sheet. The planar sheet may include a surface having information disposed or printed thereon by a printer.

In some forms, the RFID transponder may be flexible. Use of the flexible RFID transponder may permit the flag to bend without breaking said transponder.

According to yet another aspect a radio frequency identification (RFID) tag configured to be worn by a user includes a flexible band with a first end, a second end, and an elongated section extending between the first end and the second end. The RFID tag further includes a flag connected to one of the first end or the second end of the flexible band. The flag includes an RFID transponder. The flexible band is selectively formable into a loop by securing at least one of the first end and the second end to the elongated section, thereby securing the flexible band to the user. The flag spatially separates the RFID transponder from a radially-outward facing surface of the loop, and thereby apart from the user to which the band is secured.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE FIGURES

FIG. 3A is a top-down plan view of the wearable RFID tag of FIG. 1 forming a planar sheet.

FIG. 3B is a bottom-up plan view of the wearable RFID tag of FIG. 3A.

FIG. 4A is a top-down plan view of a wearable RFID tag with an alternative flag or RFID transponder position.

FIG. 4B is a bottom-up plan view of the wearable RFID tag of FIG. 4A.

FIG. 8A is a top-down plan view of a wearable RFID tag utilizing a snap-fit system in a planar configuration.

FIG. 8B is a bottom-up plan view of the wearable RFID tag of FIG. 8A.

FIG. 9A is a top-down plan view of a wearable RFID tag with a folding tab and adhesive strip, in which the RFID tag is in a planar configuration.

FIG. 9B is a top-down plan view of a wearable RFID tag with a folding tab and snap-fit system, in which the RFID tag is in a planar configuration.

DETAILED DESCRIPTION

Embodiments of the disclosure may be further understood with reference to the figures.

Figure 1:
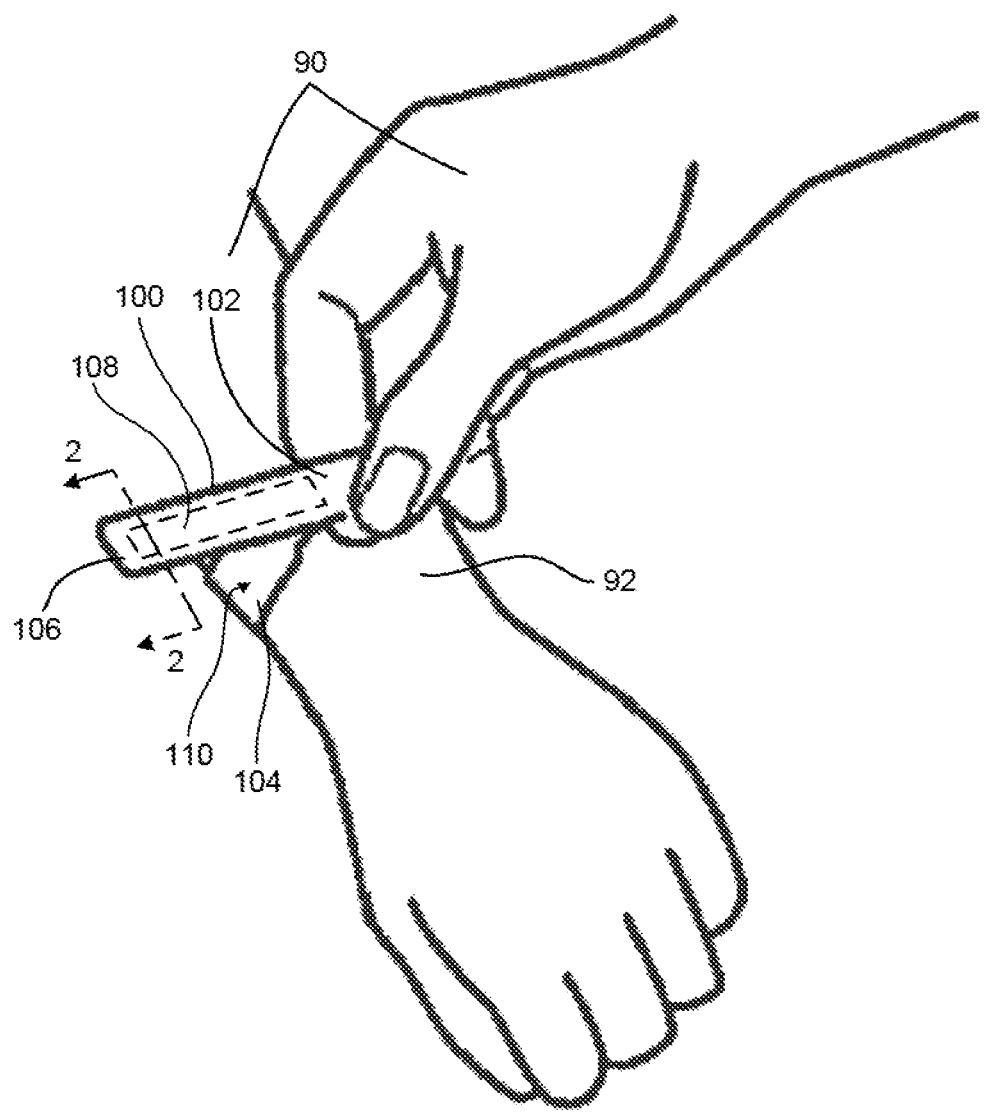
FIG. 1 is a perspective view of a wearable RFID tag having a flag and a loop securing the RFID to a user.

FIG. 1 illustrates an exemplary embodiment of a RFID tag 100 configured to be worn by a user 90. The RFID tag 100 includes a band 102 formed into a loop 104 around a wrist 92 of the user 90 with a flag 106 projecting outwardly away from the loop 104. The flag 106 includes a RFID transponder 108 which is configured to wirelessly communicate with a RFID reader (not shown). In the illustrated embodiment, the RFID transponder 108 is a passive RFID transponder. In other embodiments, however, a battery-assisted passive RFID transponder or even an active RFID transponder might be used instead.

The loop 104 is selectively formed by the strap portion of the band 102, and can be formed around an object—here the wrist 92 of the user 90—to secure the RFID tag 100 thereto. The loop 104 is adjustable and can be formed with different diameters and circumferences based on the size of the user and to accommodate attachment to alternative objects or parts of the user 90, such as an ankle. The dimensions of the loop 104 may be selected to fit snugly around an object, or to provide a limited clearance, according to the particular application or use of the RFID tag 100. Further, the loop 104 is flexible and can be formed into a non-circular shape to follow the contours of the object the loop 104 is wrapped around.

The band 102 is configured so that, after attachment to the user 90 or other object, the flag 106 extends away from the loop 104, thereby creating a spatial separation between the RFID transponder 108 that is part of the flag 106 and (1) a radially-outward facing surface 110 of the loop 104, and (2) the user 90 to which the band 102 is secured. In the illustrated embodiment, the flag 106 extends linearly away from the loop 104 such that the flag 106 is generally tangent to the radially-outward facing surface 110 of the loop 104. In other embodiments, however, the flag 106 can be configured to project outwardly from the loop 104 at an angle that is greater than or less than the angle of the illustrated embodiment.

The flag 106 is further configured so that the distance between the RFID transponder 108 and the surface of the wrist 92 is at least great enough to reduce the signal loss the RFID transponder 108 is subjected to due to the proximity of the user 90. The distance between the RFID transponder 108 and the wrist 92 can be a function of at least one of (1) the angle at which the flag 106 projects outwardly from the loop 104, (2) the length of the flag 106, and/or (3) the orientation and position of the RFID transponder 108.

In some embodiments, the separation between the RFID transponder 108 and the object to which the RFID tag 100 is secured may be greater than a minimum distance needed to eliminate the signal loss the RFID transponder 108 is subjected to due to the properties of said nearby object (e.g., wrist or ankle). The magnitude of the minimum distance can vary as a function of at least one of the properties of the signal loss-causing object, properties of the band 102, and specifications the RFID transponder 108 itself.

Figure 2:
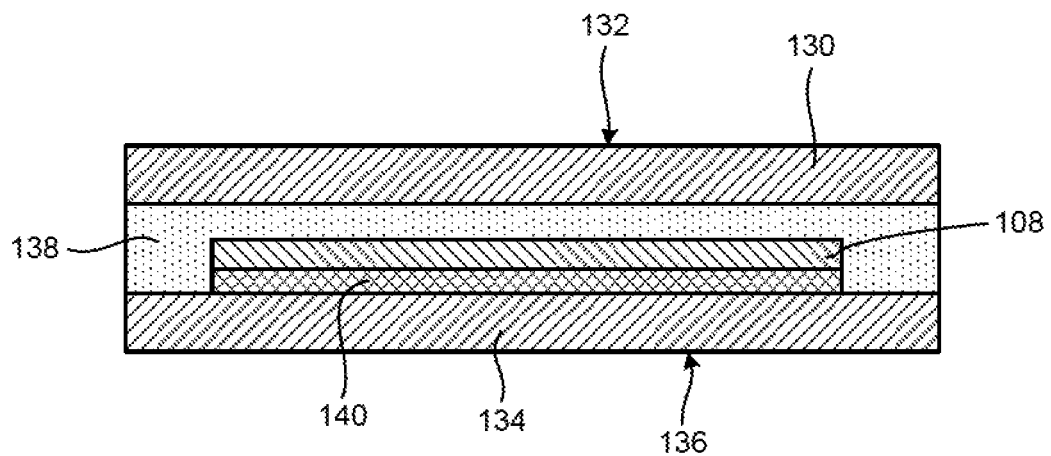
FIG. 2 is a cross-sectional schematic of the flag of FIG. 1 taken along section line 2-2.

Referring now to FIG. 2, structural details of the layers of the band 102, and particularly of the layers of the flag 106, are illustrated. The band 102—including the loop 104 and the flag 106—includes top layer 130 defining an upper surface 132 and a bottom layer 134 defining a lower surface 136, where the top layer 130 is secured to the bottom layer 134 with an adhesive 138 disposed therebetween. In the illustrated embodiment shown in the region of the flag 106, the RFID transponder 108 is retained within the flag 106 in-between the top layer 130 and the bottom layer 134. An additional layer of adhesive 140 is disposed on the bottom layer 134 and is configured to secure the RFID transponder 108 thereto. In other embodiments, however, the RFID transponder 108 can be secured to at least one of the top layer 130 or the bottom layer 134 by the same adhesive 138 used to couple the top layer 130 to the bottom layer 134. Still yet, other modes of connection between the layers are contemplated, both adhesive and non-adhesive, as well as other structural arrangements.

When the loop 104 is formed by the band 102, the upper surface 132 includes the radially-outward facing surface 110 of the loop 104 and the lower surface includes a radially-inward facing surface 144 of the loop 104. The radially-inward facing surface 144 faces, and, in some cases, makes contact with the wrist 92 or other body part. The lower surface 136 may a soft texture or finish to increase the comfort of the RFID tag 100 when worn by the user 90. Additionally, at least one of the top layer 130 and the bottom layer 134 can be a laminate material that is resistant to damage caused by at least one of liquid and abrasion.

The top layer 130 and the bottom layer 134 made from flexible materials, thereby enabling the loop 104 and the flag 106 to flex without breaking. This flexibility enables the band 102 to selectively form the loop 104, as well as a planar strip 142, described in further detail with respect to FIGS. and 3B. Although flexible, the band 102 will naturally return to a generally planar configuration if it is not secured into a loop. In the illustrated embodiments, the band 102 forms the planar strip 142 in its non-flexed state. The general stiffness of the band 102 results in the flag 106 positioning or biasing the RFID transponder 108 away from the user 90 even when the loop 104 is formed.

In other embodiments, it is contemplated that a RFID transponder could be coupled to the upper surface or the lower surface of the flag rather than inside the flag between layers. The RFID transponder could also be coupled directly to the flag or positioned within an inlay formed in the flag. Accordingly, the band can be formed from a single layer of material or more that two layers of material in alternative embodiment. Still further, it is contemplated that in multi-layer structures, the layers might be joined in other non-adhesive ways (for example, by heating the layers to form a connection between the layers).

Looking now to FIGS. 3A and 3D, the planar strip 142 formed by the band 102 is illustrated. The planar strip 142 is substantially flat and thin enough so that a printer can be utilized to print information on the flag 106, or other portions of the band 102. The band 102 includes a first end 160, a second end 162, and an elongated section 164 extending from the first end 160 to the second end 162. The flag 106 is positioned at the first end 160, and is connected to the elongated section 164.

From this form, the loop 104 can be formed with the second end 162 and the elongated section 164. Specifically, the second end 162 can be manipulated such that it is secured to the elongated section 164, thereby forming the loop 104 while also establishing a non-loop forming portion which serves as the flag 106. The particular location of the portion of the elongated section 164 to which the second end 162 is secured can be selected in accordance with the size of the object the loop 104 is wrapped around. In this way the RFID tag 100 is adjustable so that it can be secured to a plurality of objects having different sizes and dimensions. If the second end 162 is detached from the elongated section 164 (and, as a security or integrity feature, this may not be possible without destroying the connection mechanism), the band 102 will unroll, and re-form the planar strip 142.

Having described the function and general structure of an RFID tag, various methods of retaining a band in a position wherein a loop is formed will, now be discussed. It should be appreciated that the methods and structures for retaining the loop are interchangeable and are not tied to the specific embodiment of an RFID tag in which they are described. Further, any other means of retaining a loop can be used with the embodiments of this disclosure.

With reference to the embodiment illustrated in FIGS. 1, 3A, and 3B, an adhesive strip 166 is disposed on the upper surface 132 proximate the second end 162. The elongated section 164 can be manipulated to make a closed loop with itself so that the adhesive strip 166 can be secured to the lower surface 136. The section of the upper surface 132 between the second end 162 and the portion of the elongated section 164 to which the adhesive strip 166 is secured forms the radially-inward facing surface 144 of the loop 104, and corresponding the section of the lower surface 136 forms the radially-outward facing surface 110 of the loop 104.

While in FIGS. 3A and 3B, the adhesive strip is shown on the upper surface, other configurations are also clearly workable in a band design. For example, the adhesive strip may be positioned on the lower surface and, when wrapped around to for the loop, contacted against the upper surface to secure the two together.

Referring to FIGS. 4A and 4B, another embodiment of a RFID tag 200 is illustrated. Here, the adhesive strip 266 or section is disposed on the lower surface 236 of the band 202 proximate the first end 260. Similar to the RFID tag 100 described in connection to FIGS. 1, 3A, and 3B, the elongated section 264 can be manipulated to make a closed loop with itself so that the adhesive strip 266 can be secured to the upper surface 232, thereby forming the loop 204.

It is contemplated that these adhesive sections might be covered by a release liner prior to use to prevent them from unintentionally sticking to other objects which liner is removed just prior to forming the loop. Still further, it is noted that these adhesive sections may have die cut perforations or segments that, upon an attempt to separate the adhered sections from one another, cause the band itself to locally tear rather than separate the adhesive connection.

Figure 5:
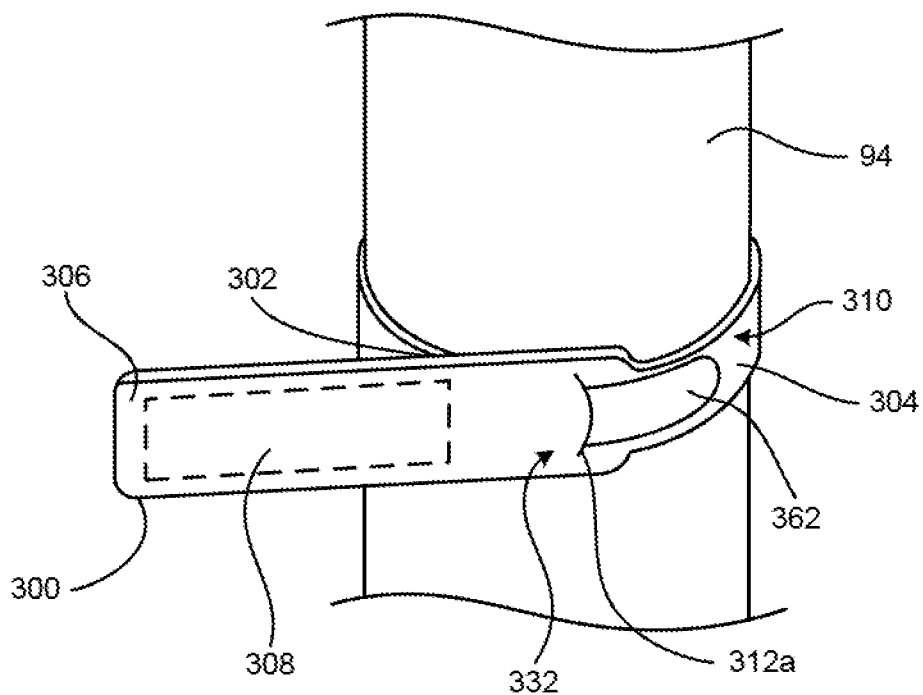
FIG. 5 is a perspective view of a wearable RFID tag having a flag with an aperture and a loop securing the RFID tag to an energy absorbing object.
Figure 6:
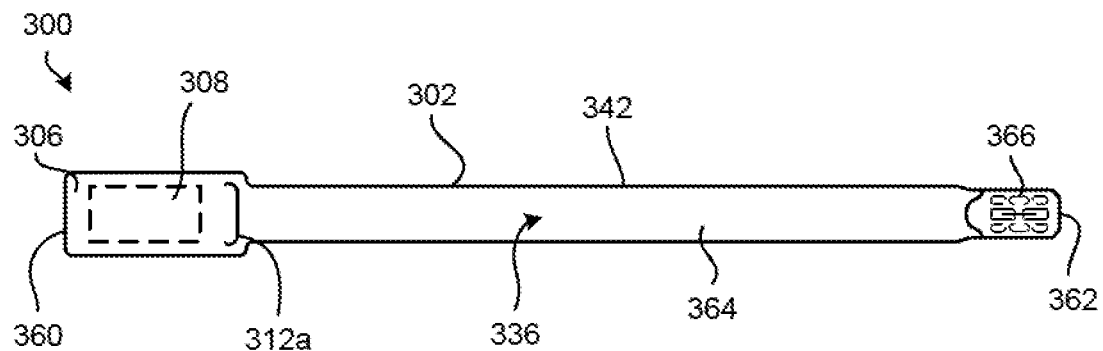
FIG. 6 is a bottom-up plan view of the RFID tag of FIG. 5 before being attached in a planar configuration (i.e., not yet wrapped and connected to form a loop).
Figure 7:
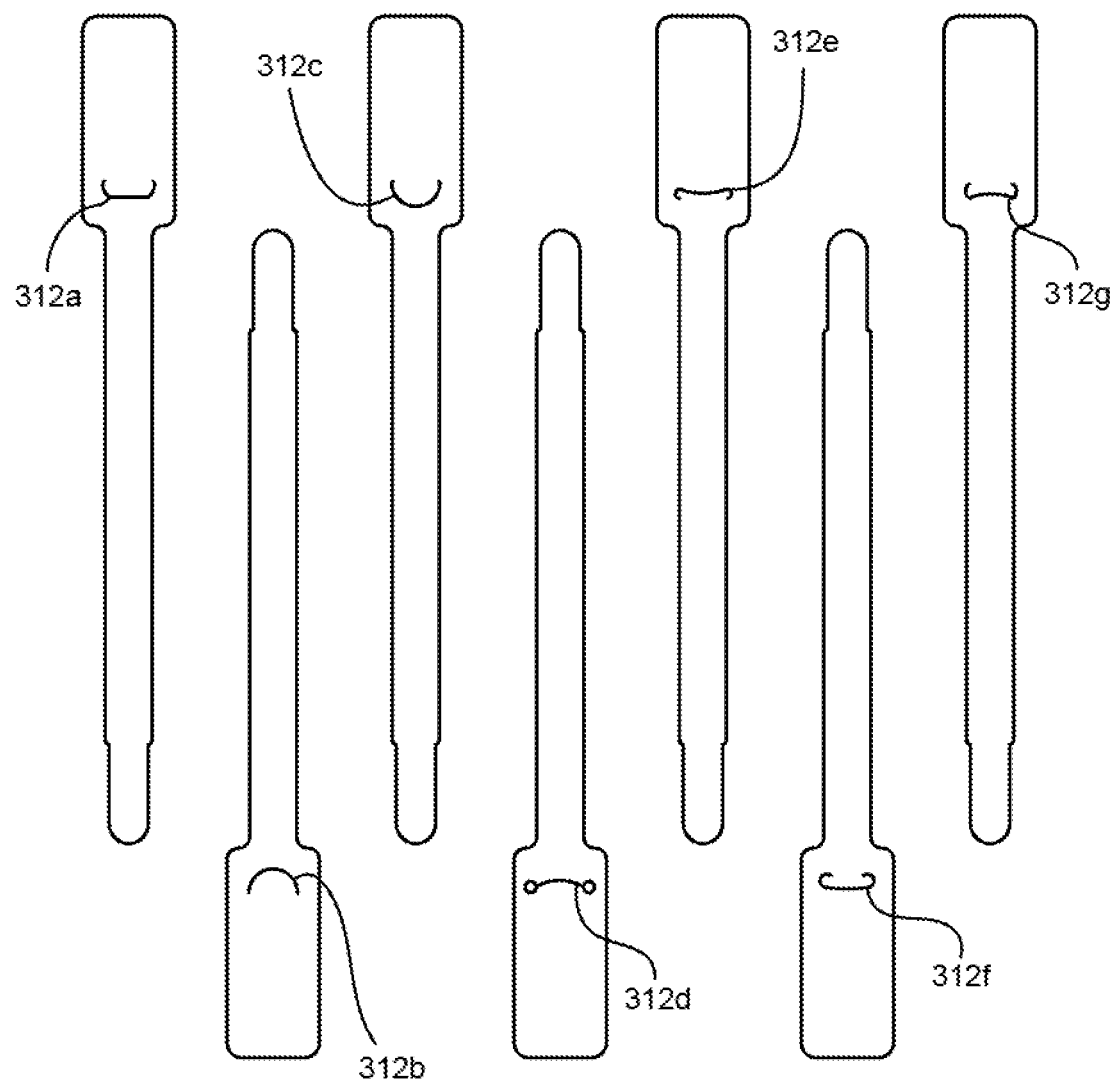
FIG. 7 is a plan view of a plurality of RFID tags, each having an alternative aperture design.

Looking now to FIGS. 5-7, yet another embodiment of a RFID tag 300 is illustrated. The RFID tag 300 includes a band 302 including a loop 304 configured to secure the RFID tag 300 to an energy absorbing object 94 and a flag 306 with an RFID transponder 308. In this embodiment, the flag 306 is wider than the elongated section 364 and the second end 362 of the band 302. As illustrated in FIGS. 5 and 6, the flag 306 further includes an aperture 312*a* extending through the base of the flag 306 from the lower surface 336 to the upper surface 332. The aperture 312*a* is dimensioned to receive the second end 362 and the elongated section 364 of the band 302. Alternative aperture configurations and geometries 312*b*-312*g* are illustrated in FIG. 7 and may be interchanged with the aperture of FIG. 6. It is further contemplated that other, alternative apertures 312*b*-312*g* which pass through the band 302 and are sized to receive the second end 362 and the elongated section 364 may be used in place of the apertures 312*a* disclosed herein.

To form the loop 304 and secure the RFID tag 300 to the energy absorbing object 94, the elongated section 364 is wrapped around the energy absorbing object 94 with the lower surface 336 facing the energy absorbing object 94 (and thereby forming the radially inward facing surface), and the second end 362 is moved through the aperture 312a, entering the through the lower surface 336 and exiting through the upper surface 332. An adhesive strip 366 disposed on the lower surface 336 proximate the second end 362 is then used to secure the second end 362 to the elongated section 364. Alternatively, in other configurations, the adhesive strip can be disposed on the upper surface 332 of the elongated section 364 adjacent to the aperture 312a.

Referring now to FIGS. 8A and 8B, embodiments of a RFID tag 400 can utilize a snap-fit system to couple the second end 462 to the elongated section 464 of the band 402. In the illustrated embodiment, the RFID tag 400 includes a peg 470 positioned proximate the second end 462 and protruding upward from the upper surface 432 of the band 402. The band 402 includes a plurality of holes 472 arranged along the elongated section 464. The peg 470 and each of the holes 472 are dimensioned so that the peg 470 can be "snapped" into the holes 472, thereby securing the second end 462 to the elongated section 464 and forming the loop 404. The size of the loop 404 can be selected by inserting the peg 470 into a hole 472 corresponding to the desired diameter of the loop 404.

In still other embodiments, an RFID tag 500a, 500b can use a folding tab 580 to couple the second end 562 to the elongated section 564 of the band 502. As illustrated in FIGS. 9A and 9B, the second end 562 of the band 502 includes a folding tab 580 that extends laterally away from the elongated section 564. Once the elongated section 564 has been manipulated to form a closed loop with itself, the folding tab 580 can be folded over to partially envelop the portion of the elongated section 564 in contact with the second end 562.

In FIG. 9A, the RFID tag 500a includes an adhesive strip 566 disposed on the elongated section 564 and the folding tab 580 proximate the second end 562. When the folding tab 580 is folded around the elongated section the adhesive strip 566 forms a bond with both sides of the elongated section 564, securing the second end 562 thereto.

FIG. 9B illustrates a similar RFID tag 500b that utilizes a snap-fit system. Similar to the RFID tag 400 of FIGS. 8A and 8B, the band 502 includes a peg 570 positioned proximate the second end 562 and a plurality of holes 572 arranged along the elongated section 564. The folding tab 580 includes an additional hole 574 which is similarly configured to retain the peg 570. After the peg 570 has been inserted into one of the holes 572 in the elongated section 564, thereby forming the loop 504, the folding tab 580 can be folded over so that the peg 570 is further received and retained by the additional hole 572.

It has further been contemplated that the folding tabs 580 described with respect to FIGS. 9A and 9B could be implemented with any other embodiment of an RFID tag disclosed herein.

Figure 10A:
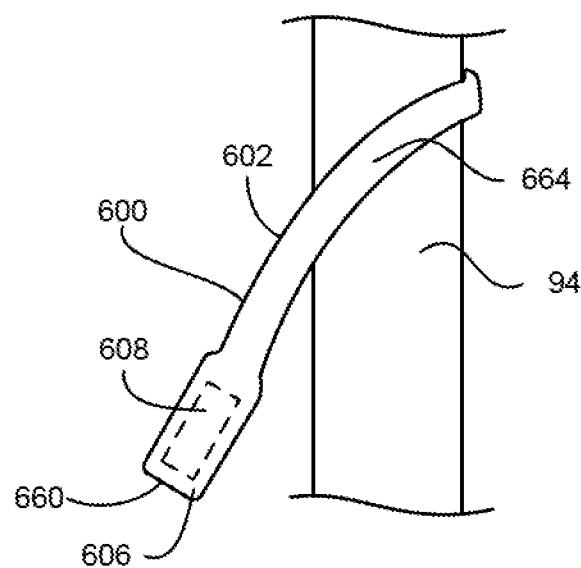
FIG. 10A is front view of a RFID tag having a single attachment point coupled to an energy absorbing object.
Figure 10B:
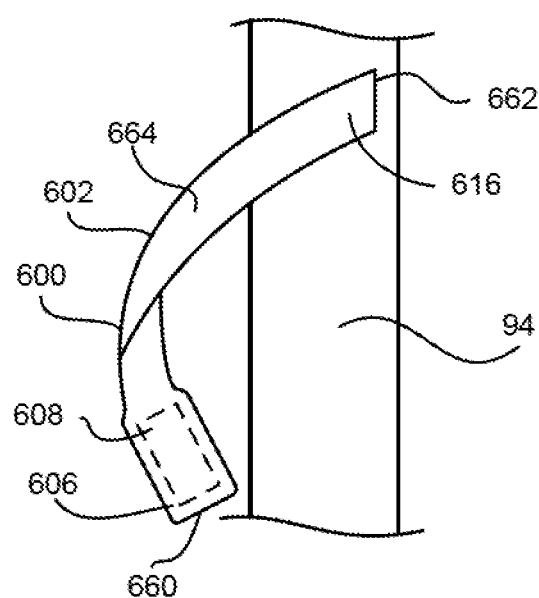
FIG. 10B is a rear view of the RFID tag of FIG. 10A.

While various embodiments of an RFID tag have been described in connection with a loop operable to secure the RFID tag to an object, other embodiments can be attached to an object through alternative methods. Looking to FIGS. 10A and 10B, RFID tag 600 can be secured to an energy absorbing object 94 with a single attachment point 616. RFID tag 600 includes a band 602 with a flag 606 positioned at a first end 660, an attachment point 616 positioned proximate a second end 662, and an elongated section 664 extending between the first end 660 and the second end 662. In the illustrated embodiment, attachment point 616 includes an adhesive (not shown) that is used to couple the band 602 to the energy absorbing object 94. It should be appreciated that any other suitable means for attaching the band 602 to the energy absorbing object 94 can be implemented in addition to, or as an alternative of, the adhesive of the attachment point 616.

While various representative embodiments of improved RFID tags have been illustrated, many general principles disclosed herein are contemplated as being independently employable as well as in all workable permutations and combinations. Further, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A radio frequency identification (RFID) tag for use with an object having energy absorbing or conductive properties, the RFID tag comprising:
a band having an upper surface and a lower surface, the band including a loop and a flag projecting outwardly from the loop, the flag including a RFID transponder retained within the flag between the upper surface and the lower surface;
wherein the flag spatially separates the RFID transponder from a radially-outward facing surface of the loop and thereby apart from an object around which the band is secured; and
wherein the band has a narrow section with a reduced width between and relative to the flag and an adjacent portion of the band forming the loop.

2. The device of claim 1, wherein the upper surface forms the radially-outward facing surface of the loop.

3. The device of claim 1, wherein the band comprises a top layer and a bottom layer secured to the top layer with an adhesive.

4. The device of claim 1, wherein the RFID transponder is secured to the flag with an adhesive.

5. The device of claim 1, wherein, prior to forming the loop, the band includes a first end, a second end opposite the first end, and an elongated section extending between the first end and the second end, wherein the elongated section is flexible, and wherein the flag is positioned at the first end.

6. The device of claim 5, wherein the flag has a width that is greater than a width of the elongated section and a width of the second end.

7. The device of claim 6, wherein the flag includes an aperture sized to receive the elongated section and wherein the loop is formed by moving the second end through the aperture.

8. The device of claim 5, further comprising an adhesive disposed on the band proximate the second end, the adhesive configured to selectively secure the second end to a portion of the elongated section and wherein the loop is formed by securing the second end to the elongated section.

9. The device of claim 5, further comprising an adhesive disposed on the band proximate the first end, the adhesive configured to selectively secure the first end to a portion of the elongated section and wherein the loop is formed by securing the first end to the elongated section.

10. The device of claim 1, wherein the band is resistant to damage caused by at least one of liquid and abrasion.

11. The device of claim 1, wherein the loop is selectively formed by the band.

12. The device of claim 1, wherein, prior to being formed into a loop, the band is a planar sheet.

13. The device of claim 12, wherein the planar sheet includes a surface having information disposed thereon by a printer.

14. The device of claim 1, wherein the RFID transponder is flexible.

15. A radio frequency identification (RFID) tag configured to be worn by a user, the RFID tag comprising:
- a flexible band having a first end, a second end, and an elongated section extending between the first end and the second end;
- a flag connected to one of the first end or the second end of the flexible band in which the flag includes an RFID transponder retained within the flag between an upper surface and a lower surface of the flag; and
- wherein the flexible band selectively forms a loop by securing at least one of the first end and the second end to the elongated section thereby securing the flexible band to the user and wherein the flag spatially separates the RFID transponder from a radially-outward facing surface of the loop and thereby apart from the user to which the flexible band is secured; and
- wherein the elongated section of the flexible band includes a narrow section proximate the flag in which the narrow section has a reduced width between and relative to the flag and an adjacent portion of the elongated section.

\* \* \* \* \*

UNITED STATES PATENT AND TRADEMARK OFFICE
CERTIFICATE OF CORRECTION

| | |
|---|---|
| PATENT NO. | : 10,733,495 B2 |
| APPLICATION NO. | : 16/116319 |
| DATED | : August 4, 2020 |
| INVENTOR(S) | : Ronald G. Ennis et al. |

Page 1 of 1

It is certified that error appears in the above-identified patent and that said Letters Patent is hereby corrected as shown below:

In the Specification

Column 5, Line 50, "3D" should be --3B--.

Signed and Sealed this
Sixth Day of October, 2020

Andrei Iancu
*Director of the United States Patent and Trademark Office*